H. FEENDERS.
Clod-Crushers.
No. 148,879.    Patented March 24, 1874.
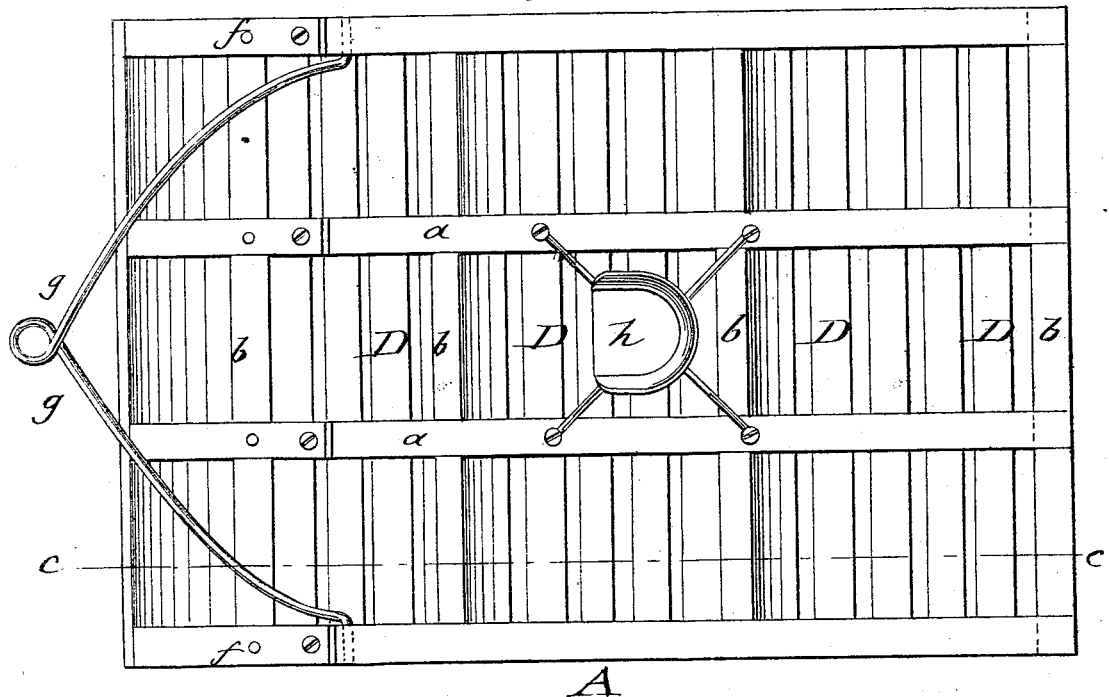
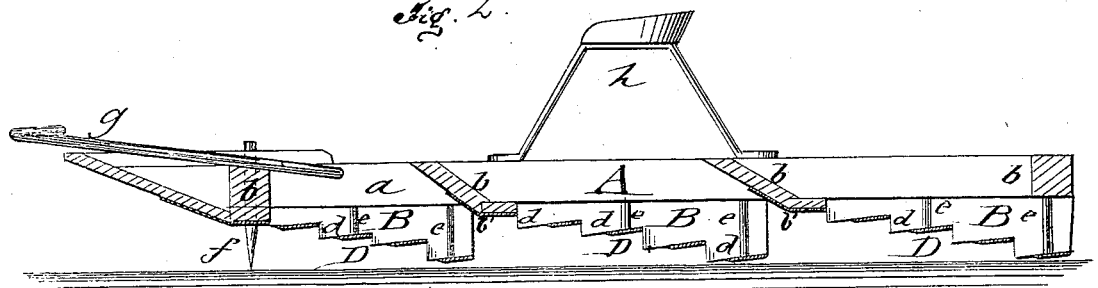
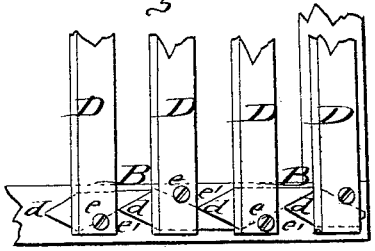
WITNESSES.                INVENTOR.
                          BY
                          ATTORNEYS.

UNITED STATES PATENT OFFICE.

HARM FEENDERS, OF CHARLES CITY, IOWA.

IMPROVEMENT IN CLOD-CRUSHERS.

Specification forming part of Letters Patent No. 148,879, dated March 24, 1874; application filed January 17, 1874.

*To all whom it may concern:*

Be it known that I, HARM FEENDERS, of Charles City, in the county of Floyd and State of Iowa, have invented a new and Improved Clod-Crusher, of which the following is a specification:

In the accompanying drawing, Figure 1 represents a top view of my improved clod-crusher; Fig. 2, a vertical longitudinal section of the same on line $c\ c$, Fig. 1; and Fig. 3, a detail bottom view, showing attachment of crushing and pulverizing knives.

Similar letters of reference indicate corresponding parts.

The object of my invention is to furnish an improved clod crushing and pulverizing implement by which the ground may be completely broken after sowing, for the purpose of retaining the moisture therein. My invention consists in the arrangement of a main supporting-frame with a series of lateral knives, which are attached at the lower side thereof to step-shaped seats, so that each knife is back of and deeper than the other, and breaks the clods by repeated concussions with the same in connection with sharp projecting edges of the seat parts.

In the drawing, A represents the supporting-frame of the clod-crusher, made of strong timber, in square or oblong shape, strengthened longitudinally by intermediate pieces $a$, and laterally by the forward-inclined pieces $b$. To the lower side of longitudinal pieces $a$ are applied the knife-seats B, which are made, by preference, of cast-iron, with wedge-shaped steps $d$, having sharp front edges. The steps $d$ are arranged one deeper than the other from front to rear, and support the laterally-extending knives D, of which four, more or less, may be arranged on seats B. The knives D are firmly applied to frame A by bolts and nuts $e$, which are placed on alternating side recesses $e'$ of seats B, connecting thereby the seats at the same time to the frame. The shape of the step-shaped seats B is fully shown in Figs. 2 and 3. The knives D are sharpened at their front edges, one or more series of them being arranged back of each other on frame A, and attached to seats B, with a slight downward inclination toward the front part of the crusher. The inclined lateral pieces $b$ are placed between two adjoining systems of knives, and provided at the lower side with metallic linings $b'$, which serve to guide and feed the clods toward the knives. By the repeated blows and cuts of the knives against the clods the same are gradually diminished in size till they are crushed and pulverized, so that an even, nicely-broken ground covers the seed. Front teeth $f$ dig furrows for the edges of the seats, while for rough and heavy ground one or more toothed front rollers may be attached, by which the largest clods may be broken before being acted upon by the knives.

The horses are attached to strong pivoted rods $g$, and directed from the seat $h$, applied to the upper side of frame, in the customary manner in agricultural machines.

Having thus described my invention, I claim as new and desire to secure by Letters Patent—

In combination with frame A $a$ of a clod-crushing machine, the inverted step-shaped metallic knife-seats B, the knife-blades D D, and the rearwardly-inclined knife-feeding brace-pieces $b\ b$, all constructed and arranged as described, and for the purpose set forth.

HARM FEENDERS.

Witnesses:
J. J. TOLERTON,
J. COLLMANN.